UNITED STATES PATENT OFFICE.

ROBERT W. CORNELISON, OF BLOOMFIELD, NEW JERSEY, ASSIGNOR TO H. B. WIGGIN'S SONS COMPANY, A CORPORATION OF NEW JERSEY.

COMPOSITION OF WATER-COLORS.

No. 854,332.　　　　Specification of Letters Patent.　　　　Patented May 21, 1907.

Application filed March 9, 1906. Serial No. 305,087.

*To all whom it may concern:*

Be it known that I, ROBERT W. CORNELISON, residing at Bloomfield, Essex county, New Jersey, and being a citizen of the United States, have invented certain new and useful Improvements in Composition of Water-Colors, adapted to be put up dry in powdered form.

The composition invented by me consists of a dry powder, in the manufacture of which I use as an ingredient a prepared starchy substance, which consists of any suitable starchy substance thoroughly boiled with water, and then evaporated to dryness, and the residue ground to a powder. In connection with said substance I use also a vegetable gum, such as gum arabic or gum tragacanth, or the equivalent of the same, and a suitable proportion of coloring material.

In preparing my composition of dry colors I have found that the following proportions produce very satisfactory results: 10 parts of prepared starchy substance 4 parts of gum tragacanth, and 4 parts of a soluble dye stuff. These are to be all reduced to a finely powdered condition and intimately mixed. I do not limit myself to the exact proportions specified, as these may be varied, if desired. When desired to be used, a sufficient quantity is taken, thoroughly stirred into water, and then used in the same way as any water color is used, being applied to surfaces with a brush, either directly, or by the use of stencil designs, &c.

This composition is especially adapted for staining burlap and similar materials, often used in house decoration, but is not restricted to this use.

Having thus described my invention, what I claim as new, and desire to secure by Letters Patent, is:

1. A coloring compound, consisting of a prepared starchy substance, vegetable gum, and a soluble dye, the whole soluble in water, substantially as described.

2. A coloring compound, consisting of a prepared starchy substance, gum tragacanth, and a soluble dyeing material, the whole soluble in water, substantially as described.

ROBERT W. CORNELISON.

Witnesses:
　JOHN R. WINANS,
　MELVILLE B. NEWBY.